United States Patent
Hackett (10) Patent No.: US 12,462,140 B2
(45) Date of Patent: Nov. 4, 2025

(54) SYSTEM AND METHOD FOR SIGNAL CONVERSION IN A NEURAL NETWORK

(71) Applicant: Silergy Semiconductor Technology (Hangzhou) LTD, Hangzhou (CN)

(72) Inventor: Nathan Hackett, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 1173 days.

(21) Appl. No.: 17/315,545

(22) Filed: May 10, 2021

(65) Prior Publication Data

US 2021/0357724 A1 Nov. 18, 2021

(30) Foreign Application Priority Data

May 15, 2020 (CN) .......................... 202010412693.0

(51) Int. Cl.
G06F 17/00 (2019.01)
G06N 3/04 (2023.01)
H03F 3/45 (2006.01)

(52) U.S. Cl.
CPC ............ *G06N 3/04* (2013.01); *H03F 3/45475* (2013.01)

(58) Field of Classification Search
CPC .......... G06N 3/04; G06N 3/048; G06N 3/063; G06T 1/247; H03F 3/45475; G06F 30/367; G06F 7/548; G06F 7/544; G06F 2207/4824; G10L 15/063; G10L 15/142; G01T 1/247
USPC ....................................................... 706/22
See application file for complete search history.

(56) References Cited

U.S. PATENT DOCUMENTS

| | | | | |
|---|---|---|---|---|
| 4,298,833 A | * | 11/1981 | Edwards | G05B 13/0205 318/621 |
| 4,403,184 A | * | 9/1983 | Witt | A61B 5/4362 324/76.35 |
| 5,043,913 A | | 8/1991 | Furutani | |
| 5,068,662 A | | 11/1991 | Guddanti et al. | |
| 5,161,014 A | | 11/1992 | Pearson et al. | |
| 5,247,605 A | | 9/1993 | Engeler | |
| 5,455,583 A | | 10/1995 | Stryjewski | |
| 5,532,950 A | | 7/1996 | Moses et al. | |
| 5,995,619 A | * | 11/1999 | Bailly | H04M 1/76 379/394 |
| 6,031,380 A | * | 2/2000 | Gleixner | G01D 5/165 324/683 |
| 7,345,604 B2 | | 3/2008 | Watson | |
| 8,234,227 B2 | | 7/2012 | Smallridge | |
| 9,213,937 B2 | | 12/2015 | Ponulak | |
| 2003/0204389 A1 | * | 10/2003 | Feldmann | G06F 30/367 703/19 |
| 2008/0030236 A1 | * | 2/2008 | Csanyi | H04L 27/148 327/44 |
| 2013/0020478 A1 | * | 1/2013 | Takasaki | G01T 1/247 250/252.1 |
| 2013/0151450 A1 | | 6/2013 | Ponulak | |

(Continued)

*Primary Examiner* — Jason T Edwards (57) ABSTRACT

A system for signal conversion in a neural network can include: a processing module configured to control an output signal of the processing module to be a fixed value, when an input signal of the processing module is in a first interval; the processing module being configured to control the output signal to be in a preset non-linear relationship with the input signal, when the input signal is in a second interval; and where the output signal increases nonlinearly with the increase of the input signal and finally converges.

17 Claims, 7 Drawing Sheets

(56) References Cited

U.S. PATENT DOCUMENTS

| | | | |
|---|---|---|---|
| 2015/0092819 A1* | 4/2015 | Sugahara | H03G 3/3005 |
| | | | 374/178 |
| 2015/0150753 A1* | 6/2015 | Racette | A61H 23/02 |
| | | | 601/46 |
| 2016/0071003 A1* | 3/2016 | Abrishamkar | H04B 1/406 |
| | | | 706/22 |
| 2016/0126969 A1* | 5/2016 | Berberkic | H03M 7/16 |
| | | | 702/85 |
| 2019/0042924 A1* | 2/2019 | Pasca | G06F 7/548 |
| 2020/0333169 A1* | 10/2020 | Krall | G01D 18/00 |
| 2021/0287354 A1* | 9/2021 | Kumar | G06T 7/10 |

\* cited by examiner

SYSTEM AND METHOD FOR SIGNAL CONVERSION IN A NEURAL NETWORK

RELATED APPLICATIONS

This application claims the benefit of Chinese Patent Application No. 202010412693.0, filed on May 15, 2020, which is incorporated herein by reference in its entirety.

FIELD OF THE INVENTION

The present invention generally relates to the field neural network calculation, and more particularly to systems and methods for signal conversion in a neural network.

BACKGROUND

Biological neural networks have inspired the development of artificial neural networks, which are a kind of machine learning technology that simulates the human brain in order to realize artificial intelligence, and have achieved good results in many fields, such as image recognition and speech recognition. In a multi-layer neural network, the neuron signal of the upper layer may need to be activated by an activation function before being input to a next layer. The activation function can perform a nonlinear transformation on the input signal, thus enabling it to learn and perform more complex tasks.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

There are many kinds of activation functions, including Sigmoid, Tanh, ReLU, Leaky ReLU, and so on. A Sigmoid function is an earlier activation function, and is expressed by: $\text{Sigmoid}(x)=1/(1+e^{-x})$. That is, any input signal that is input into the Sigmoid function can be outputted ranging between 0 and 1. Since the output range of the Sigmoid function is limited, the gradient-based optimization method can be more stable. However, disadvantages include that the Sigmoid function needs exponentiation and division operation, causing high calculation cost, and the output is not centered at zero, which may lead to the decrease of the convergence speed and the disappearance of gradient. The Tanh function, also known as a hyperbolic tangent function, solves the problem that the output signal of Sigmoid function is not centered at 0. The ReLU function is the most widely used activation function in designing neural networks, and is expressed by: $\text{ReLU}=\max(0, x)$. The ReLU function does not need exponentiation, so the operation speed is fast and the complexity is reduced. Also, the output signal of ReLU function under some input signals is zero, so ReLU function also causes the sparsity of the network, which reduces the complexity of time and space. However, the output signal of ReLU function is not limited, and there is the possibility of calculation overflow. Leaky ReLU may improve the ReLU function's problem that when x is less than 0, the output is all 0.

Figure 1:
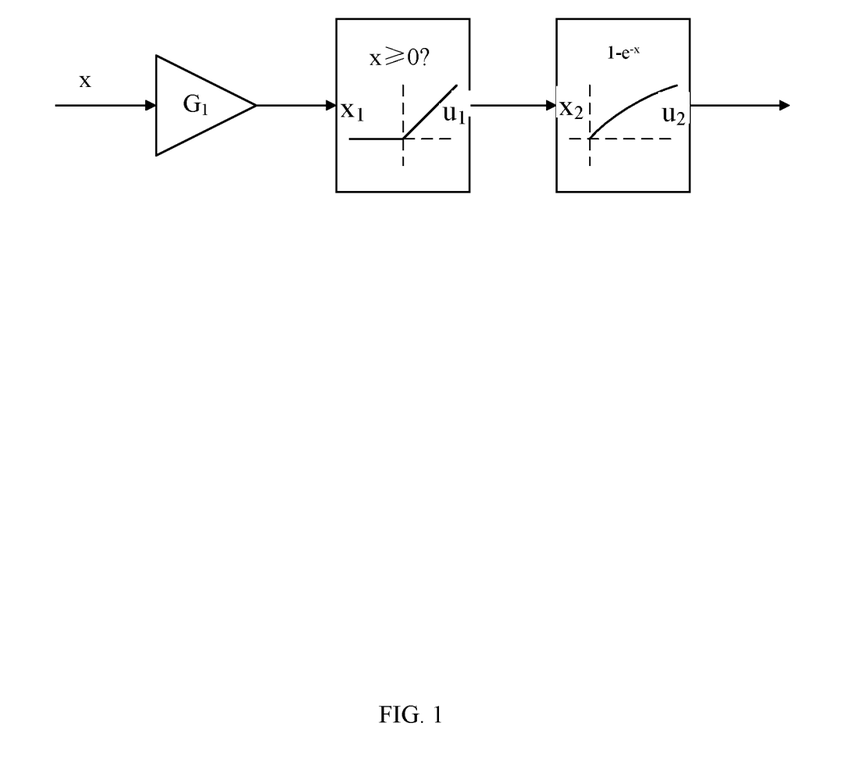
FIG. 1 is a schematic block diagram of an example activation function, in accordance with embodiments of the present invention.

Referring now to FIG. 1, shown is a schematic block diagram of an example activation function, in accordance with embodiments of the present invention. In this example, activation function f(x) can be expressed as below in formula (1).

$$f(x) = \begin{cases} 1 - e^{-ax+b}, & x > 0 \\ 0, & x \le 0 \end{cases} \quad (1)$$

Here, "a" is a preset coefficient greater than zero, "b" is a constant, and b can be equal to zero. Here, take b=0 as an example for illustration. First, input signal x can be processed by the proportional operation through amplifier $G_1$ to obtain signal $x_1$ that equals to ax, and then signal $x_1$ may be rectified. If x is not less than zero, signal $u_1$=ax; and if x is less than zero, signal $u_1$=0. Then, signal u1 is taken as another input signal $x_2$ to obtain output signal $u_2$ through non-linear processing, i.e., $u_2=1-e^{-u1}$. Thus, activation function f(x) can be obtained, and if x is not less than zero, $f(x)=1-e^{-ax}$, and if x is less than zero, $f(x)=0$. It should be understood that, in some embodiments, the proportional operation processing and the rectified processing may be interchanged; that is, the rectification can be performed first, and then the proportional operation is performed.

It can be seen from FIG. 1 that when input signal x is not less than zero, that is, input signal x is in a second interval, output signal $u_2$ and input signal x may have a preset non-linear relationship. For example, as input signal x increases, output signal $u_2$ can increase nonlinearly and eventually converge (e.g., output signal $u_2$ can converge to 1). Since the output signal of the activation function is limited, there can be no instability caused by overflow. Also, the activation function shows the same training advantage as the ReLU activation function.

Figure 2:
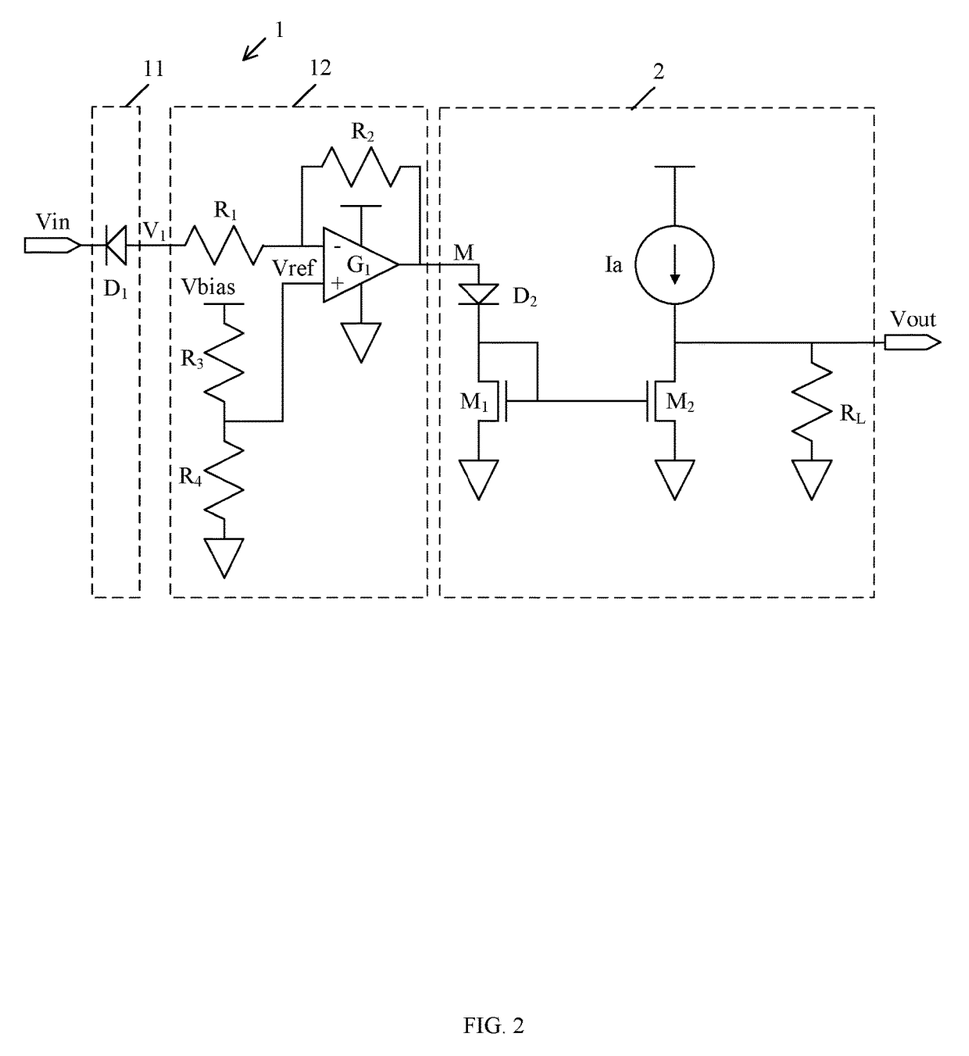
FIG. 2 is a schematic block diagram of an example analog implementation system for signal conversion in the neural network, in accordance with embodiments of the present invention.

Referring now to FIG. 2, shown is a schematic block diagram of an example analog implementation system for signal conversion in the neural network, in accordance with embodiments of the present invention, so as to implement the activation function described in FIG. 1 with an analog circuit. In this example, the system can include a processing module, that maintains an output signal of the processing module at a fixed value (e.g., 0), when an input signal of the processing module is in a first interval, and controls the output signal be in a preset non-linear relationship with the input signal, when the input signal is in a second interval. In this example, the output signal can nonlinearly increase with the increase of the input signal and eventually converge. When the input signal is less than zero, the input signal is in a "first" interval, and the output signal is zero. When the input signal is not less than zero, the input signal is in a "second" interval. The analog implementation system can realize the above-mentioned non-linear relationship through exponential calculation.

For example, the processing module can include processing modules 1 and 2. As used herein, a "module" can include hardware circuitry. Processing module 1 can generate intermediate signal M after rectifying and amplifying input signal Vin. Processing module 2 can perform non-linear processing on intermediate signal M to generate output signal Vout. For example, processing module 1 can include rectifier module 11 and gain module 12. Rectifier module 11 can rectify input signal Vin to allow input signal Vin in the second interval to pass through, thereby obtaining input signal Vin that is not less than zero as signal $V_1$. Gain module 12 can receive signal $V_1$, and may generate intermediate signal M that is proportional to signal $V_1$.

In this example, the positions of rectifier module 11 and gain module 12 can be interchanged. In some embodiments, rectifier circuit 11 can receive input signal Vin, and output first signal $V_1$ to gain module 12 after rectification, such that intermediate signal M is obtained. In other embodiments, gain module 12 can receive input signal Vin to generate a signal proportional to input signal Vin to rectifier module 11, and rectifier module 11 may then rectify the signal to generate intermediate signal M after rectification. In this example, rectifier module 11 can include diode $D_1$ having a cathode for receiving input signal Vin, and an anode connected to an input terminal of gain module 12, in order to obtain the rectified input signal not less than zero (e.g., signal $V_1$). It should be understood that other unidirectional conduction devices that can obtain the rectified input signal not less than zero are also suitable in particular embodiments.

Gain module 12 can include a proportional operation circuit. In this example, input terminals of the proportional operation circuit can respectively receive signal $V_1$ and reference signal Vref, and an output terminal of the proportional operation circuit can generate intermediate signal M proportional to signal $V_1$. For example, the gain of the proportional operation circuit is a preset coefficient. In this example, the proportional operation circuit can include operational amplifier $G_1$ and resistors $R_1$ and $R_2$ for setting the gain of operational amplifier $G_1$ to represent preset coefficient "a." A non-inverting input terminal of operational amplifier $G_1$ can receive reference signal Vref, and an inverting input terminal of operational amplifier $G_1$ can receive signal $V_1$. Resistor $R_1$ can connect between signal $V_1$ and the inverting input terminal of operational amplifier $G_1$, and resistor $R_2$ can connect between the inverting input terminal and the output terminal of operational amplifier $G_1$. Thus, resistors $R_1$ and $R_2$ can form a negative feedback, so intermediate signal M generated by operational amplifier $G_1$ can be expressed as below in formula (2).

$$M = -\frac{R_2}{R_1} \times V_1 + \frac{R_1 + R_2}{R_1} \times Vref \qquad (2)$$

Here, $R_2/R_1$ may represent preset coefficient "a," and $[(R_1+R_2)/R_1 \times Vref]$ may represent constant "b." In this example, reference signal Vref can be generated by bias voltage Vbias divided by resistors $R_3$ and $R_4$. It should be understood that bias voltage Vbias can also be zero, such that constant "b" is zero. Processing module 2 can obtain a non-linear signal with natural constant "e" as a base and intermediate signal M as an exponent, and may generate output signal Vout according to a difference between a preset value and the non-linear signal. For example, processing module 2 can include diode $D_2$ and a current mirror. Those skilled in the art will recognize that when the voltage applied to diode $D_2$ exceeds a turn-on voltage of diode $D_2$, its volt-ampere characteristic can take an exponential form. Therefore, the characteristics of the diode can be utilized to convert intermediate signal M into current Im in the exponential form, that is as shown below in formula (3).

$$Im = e^M \qquad (3)$$

Further, transistor $M_1$ that is connected in series with diode $D_2$ and transistor $M_2$ may form the current mirror, so a current flowing through transistor $M_2$ can be equal to current Im flowing through transistor $M_1$. For example, transistor $M_1$ can connect between diode $D_2$ and a ground, and a first power terminal and a control terminal of transistor $M_1$ can connect together. Transistor $M_2$ can connect between the output terminal of processing module 2 and the ground, and a control terminal of transistor $M_2$ can connect to the control terminal of transistor $M_1$. Further, processing module 2 can also include a constant current source connected with a first power terminal of transistor $M_2$, which produces current Ia. Processing module 2 can also include output resistor $R_L$ connected between the output terminal of processing module 2, e.g., a common node of the constant current source and transistor $M_2$ and the ground. Therefore, output signal Vout generated across output resistor $R_L$ can be as below in formula (4).

$$Vout = (Ia - Im) \times R_L \qquad (4)$$

When current Ia equals to 1, and the resistance of resistor $R_L$ is 1, the above formula can be simplified as below in formula (5).

$$Vout = 1 - e^M = 1 - e^{-a \times Vin + b} \qquad (5)$$

For the above formula (5), when bias voltage Vbias is zero, reference signal Vref is zero, and thus constant "b" is zero, so the above formula (5) can be further simplified as below in formula (6).

$$Vout = 1 - e^m = 1 - e^{-a \times Vin} \qquad (6)$$

It should be understood that current Ia generated by the constant current source can also be generated according to other currents in the circuit, which is not limited herein. The above descriptions give an example of implementing a new activation function by means of an analog circuit to realize a system for signal conversion in the neural network. The new activation function has the advantages of both ReLu activation function and Sigmoid activation function, and the implementation circuit is relatively simple.

Figure 3:
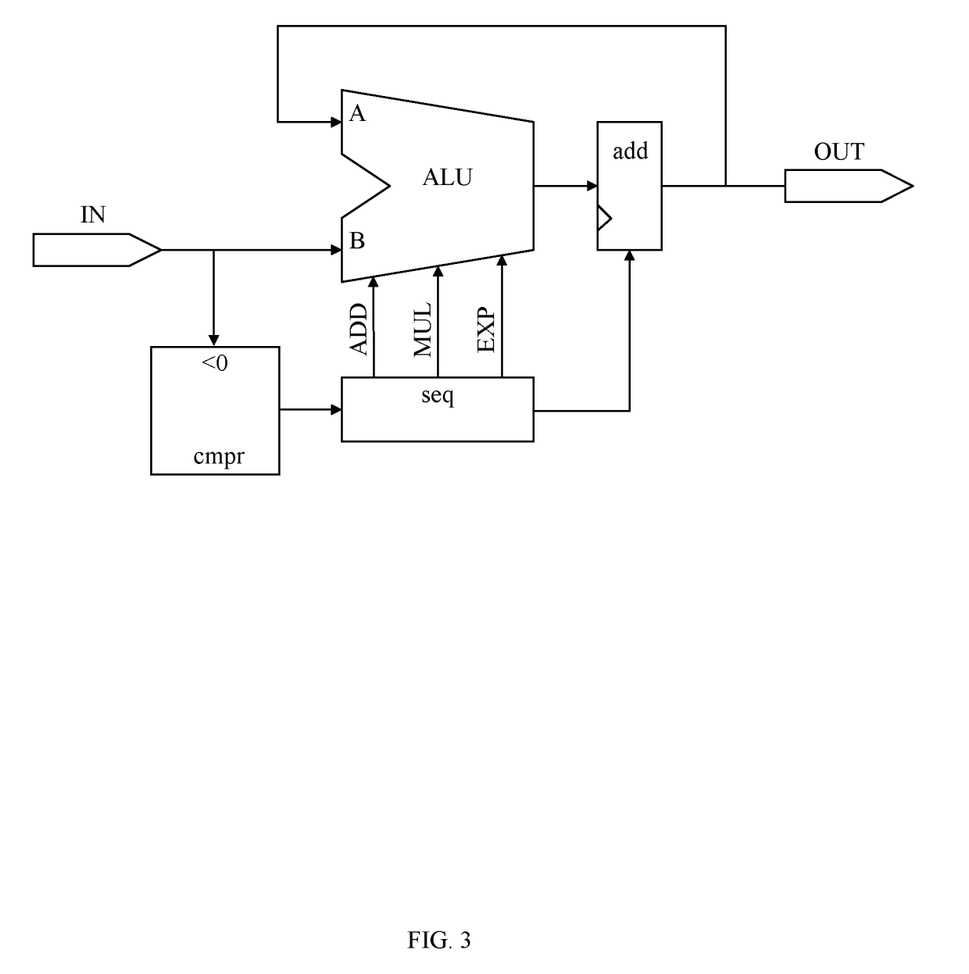
FIG. 3 is a schematic block diagram of a first example digital implementation system for signal conversion in the neural network, in accordance with embodiments of the present invention.

Referring now to FIG. 3, shown is a schematic block diagram of a first example digital implementation system for signal conversion in the neural network, in accordance with embodiments of the present invention. In this example, the digital implementation system can realize the activation function f(x) of formula (1) by adopting arithmetic logic unit ALU to perform signal conversion. The system also includes comparator cmpr, controller seq, and accumulator add. Here, comparator cmpr can determine whether input signal IN is greater than 0, and may transmit the comparison result to controller seq, such that controller seq can perform corresponding control. For example, input terminal A of arithmetic logic unit ALU can connect to an output terminal of accumulator add, input terminal B of arithmetic logic unit ALU can receive input signal IN, and an input terminal of accumulator add can connect to an output terminal of arithmetic logic unit ALU.

When input signal IN is less than zero, controller seq can control the output signal of arithmetic logic unit ALU to be zero. When input signal IN is not less than zero, controller seq can control arithmetic logic unit ALU to execute various arithmetic operations, exponential operations, proportional operations, and addition operations in sequence according to the activation function f(x) in the above formula (1). After each step of the operations is performed, the intermediate result for each step can be saved in accumulator add, and accumulator add passes the intermediate result to input terminal A of arithmetic logic unit ALU, and then uses the intermediate result as a new input signal to continue the next operation. Finally, after the final step is finished, output signal OUT can be generated by accumulator add to obtain the activation function f(x) in the above formula (1).

Figure 4:
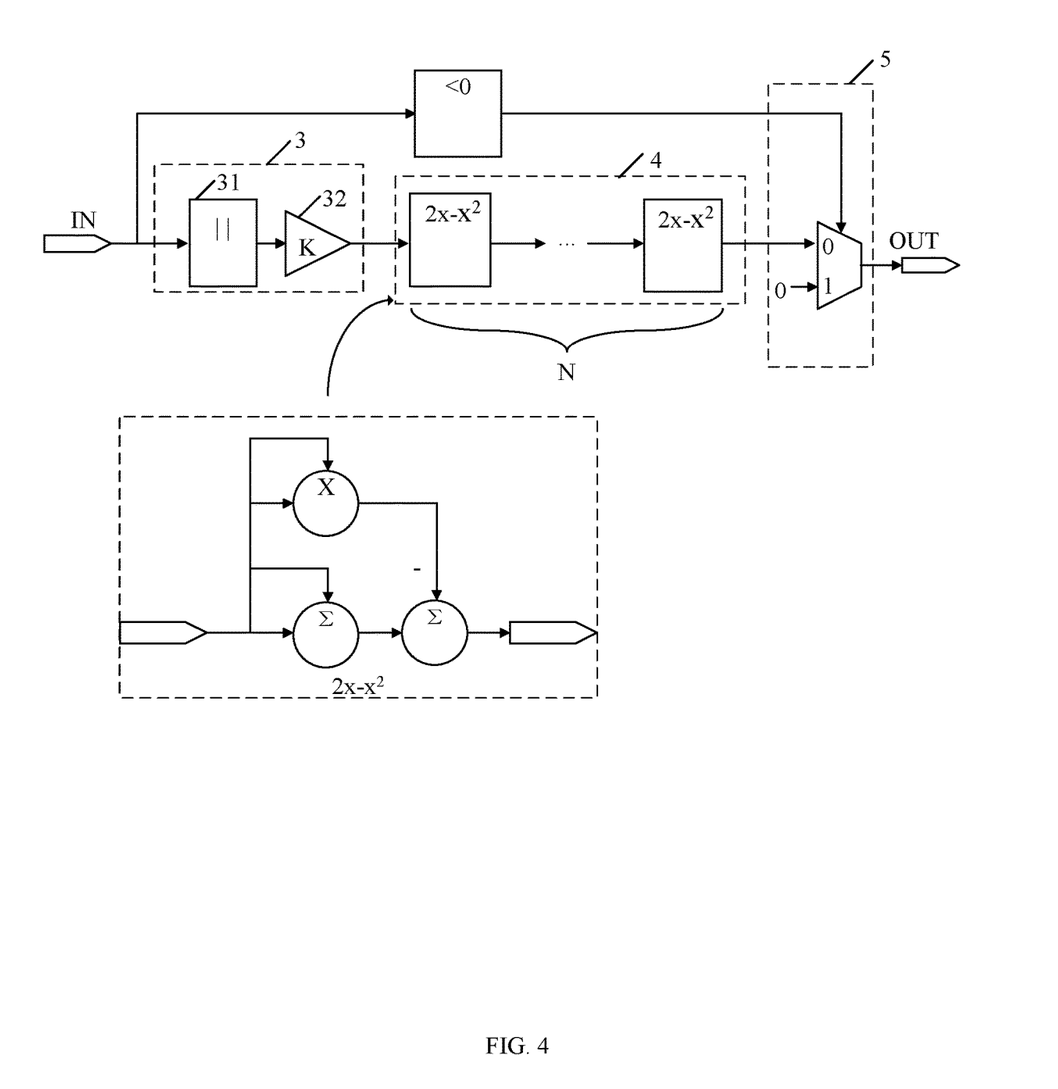
FIG. 4 is a schematic block diagram of a second example digital implementation system for signal conversion in the neural network, in accordance with embodiments of the present invention.

Referring now to FIG. 4, shown is a schematic block diagram of a second example digital implementation system for signal conversion in the neural network, in accordance with embodiments of the present invention. The first example digital implementation system is realized by applying arithmetic logic unit ALU, and in this example, the digital signal processing system is applied and the calculation result of the above formula (5) is approximated in an iterative manner. The system can include a processing module that can realize the non-linear relationship between output signal OUT and input signal IN through multiple iteration calculations. The processing module can include processing modules 3 and 4. For example, processing module 3 can obtain the absolute value of input signal IN and then amplify it to generate intermediate signal M. Processing module 4 can receive intermediate signal M, and use intermediate signal M to perform multiple iteration calculations, so as to approximate the non-linear relationship between output signal OUT and input signal IN in the second interval.

For example, processing module 3 can include absolute value module 31 and gain module 32. In this example, absolute value module 31 can obtain an absolute value of input signal IN, and gain module 32 can receive the absolute value of input signal IN and obtain intermediate signal M that is proportional to absolute value of input signal IN. It should be understood that the positions of absolute value module 31 and gain module 32 can be interchanged. In some embodiments, absolute value module 31 can receive input signal IN, an output terminal of absolute value module 31 can connect to an input terminal of gain module 32, and an output terminal of gain module 32 can generate intermediate signal M, e.g., M=a|IN|, where "a" is the gain of gain module 32. In other embodiments, gain module 32 can receive input signal IN, an output terminal of gain module 32 can connect to an input terminal of absolute value module 31, and an output terminal of absolute value module 31 can generate intermediate signal M, e.g., M=a|IN|.

For example, processing module 4 can receive intermediate signal M and perform multiple iteration calculations, so as to generate an output signal that has the non-linear relationship with the input signal. In this example, processing module 4 can include a plurality of calculation modules, which are cascaded, and each calculation module can perform an iterative calculation of $(2x-x^2)$, where x is an input signal of each calculation module. For example, the number of calculation modules is N, where N is a positive integer, and each of the input terminals of the second to Nth calculation modules can connect with the output terminal of the previous calculation module, thereby forming a cascade connection.

The output terminal of the Nth calculation module can generate the output signal. That is, the input terminal of the first calculation module can receive intermediate signal M, and may perform the calculation of $(2M-M^2)$ to generate first calculation result $M_1$. Then, first calculation result $M_1$ may be transmitted to the input terminal of the second calculation module, and the second calculation module can perform the calculation of $(2M_1-M_1^2)$ to generate second calculation result $M_2$, which can be transmitted to the input terminal of the third calculation module, and so on, until the Nth calculation module generates the output signal after the calculation of $(2M_{N-1}-M_{N-1}^2)$. Those skilled in the art will recognize that the output signal generated by processing module 4 can be closer to $1-e^{-M}$ when the iterative calculation is performed for more times.

The system can also include selection module 5, which can selectively output different signals by comparing input signal IN against zero. In this example, when input signal IN is less than zero, selection module 5 can select zero as output signal OUT, and when input signal IN is not less than zero, selection module 5 can select the output signal of processing module 4 as output signal OUT of the system. That is, after selection module 5, output signal OUT can be expressed as below in formula (7).

$$\begin{cases} \text{OUT} \approx 1-e^{-aIN}, & \text{IN} \geq 0 \\ \text{OUT} = 0, & \text{IN} < 0 \end{cases} \quad (7)$$

Figure 5:
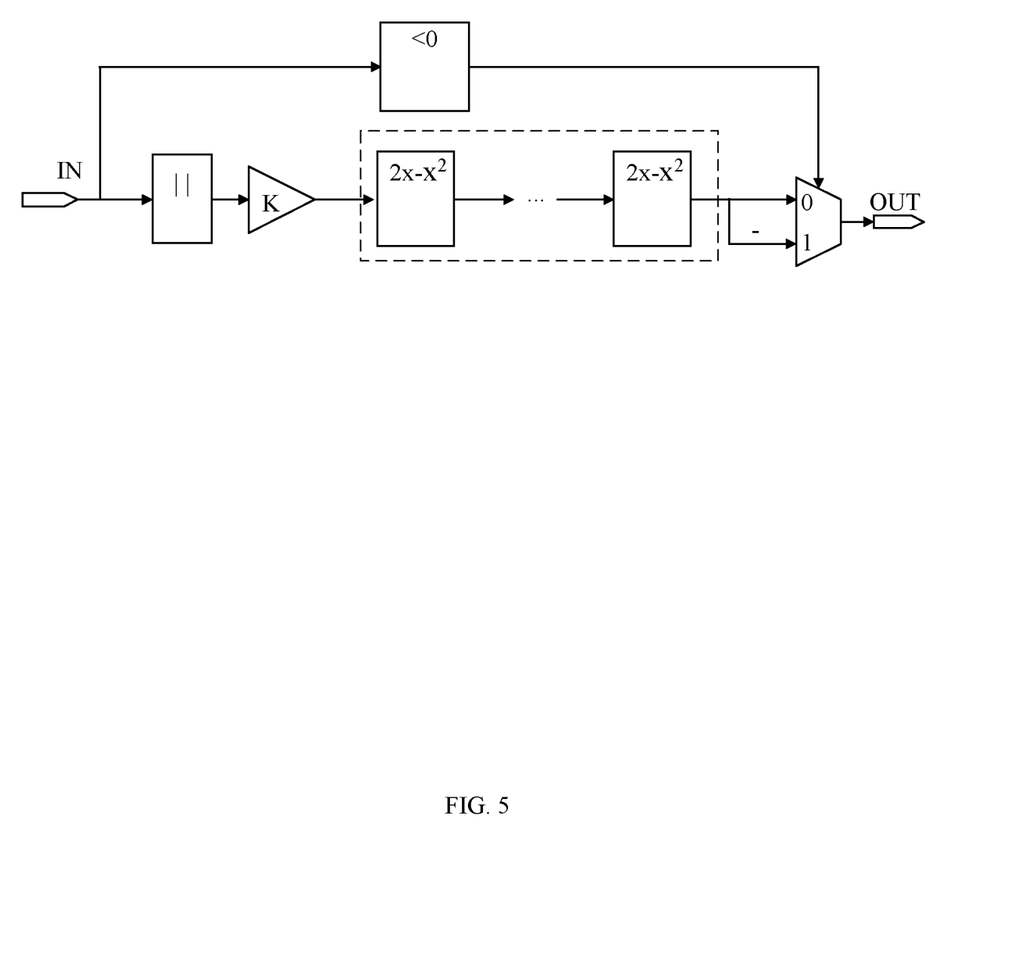
FIG. 5 is a schematic block diagram of a third example digital implementation system for signal conversion in the neural network, in accordance with embodiments of the present invention.

In some embodiments, selection module 5 can selectively output different signals according to different requirements. Referring now to FIG. 5, shown is a schematic block diagrams of a third example digital implementation system for signal conversion in the neural network, in accordance with embodiments of the present invention. Here, the difference is the selection module. In this particular example, input signal IN is not required to be rectified, that is, when input signal IN is less than zero, output signal OUT is not zero, but equals to the opposite value of the output signal of processing module 4. Thus, output signal OUT of selection module 5 can be as below in formula (8).

$$\begin{cases} \text{OUT} \approx 1-e^{-aIN}, & \text{IN} \geq 0 \\ \text{OUT} \approx e^{aIN}-1, & \text{IN} < 0 \end{cases} \quad (8)$$

Figure 6:
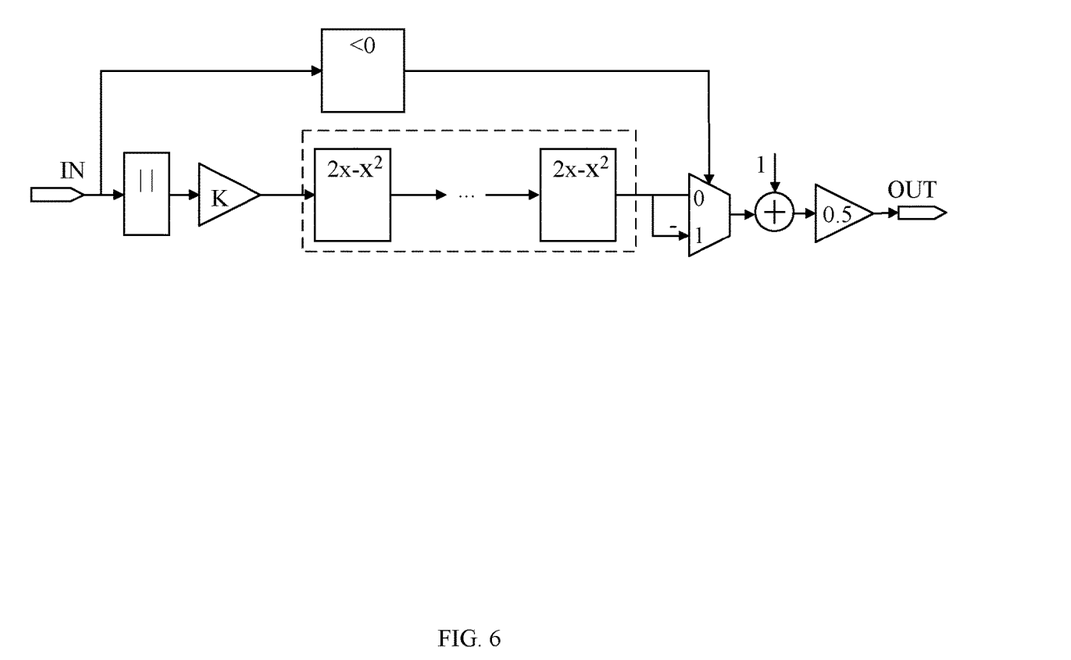
FIG. 6 is a schematic block diagram of a fourth example digital implementation system for signal conversion in the neural network, in accordance with embodiments of the present invention.

Referring now to FIG. 6, shown is a schematic block diagram of a fourth example digital implementation system for signal conversion in the neural network, in accordance with embodiments of the present invention. Under the situation with no sign, the system in this example can also include a superposition unit and a bias unit, as compared with the system in FIG. 5, to make the output signal greater than zero at any time. Therefore, output signal OUT can be as below in formula (9).

$$OUT \approx 0.5 \times (1 + A(x)), \quad (9)$$

$$A(x) \approx \begin{cases} 1 - e^{-aIN}, & IN \geq 0 \\ e^{aIN} - 1, & IN < 0 \end{cases}$$

In this way, particular embodiments may adopt a method of multi-iteration to approximate a new activation function without complicated calculations, thereby saving time and space, and the implementation circuit can be relatively simple. It should be understood that the system may also include a bias module to increase the bias of the activation function (e.g., constant "b") as required in a particular application.

Figure 7:
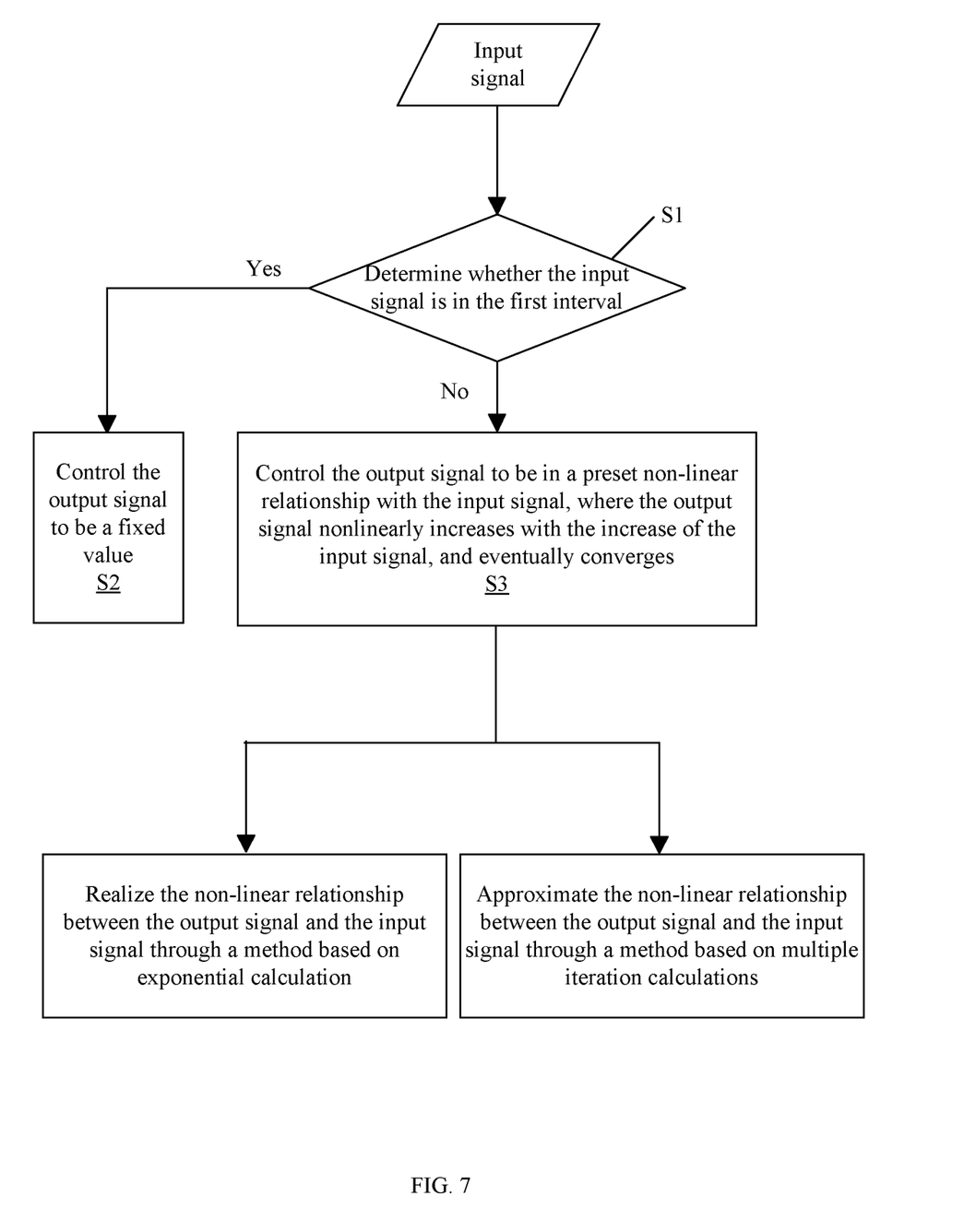
FIG. 7 is a flow diagram of an example method for signal conversion in the neural network, in accordance with embodiments of the present invention.

Referring to FIG. 7, shown is a flow diagram of an example method for signal conversion in the neural network, in accordance with embodiments of the present invention. In this example, at S1, it can be determined whether the input signal is in the first interval. If yes, S2 can be performed; if not, S3 can be performed. In S2, when the input signal is in the first interval, the output signal can be controlled to be a fixed value. In S3, when the input signal is in the second interval, the output signal can be controlled to be in a preset non-linear relationship with the input signal. For example, the output signal can nonlinearly increase with the increase of the input signal, and can eventually converge.

There are two ways to realize the non-linear relationship between the output signal and the input signal in S3. One is to realize the non-linear relationship between the output signal and the input signal through a method based on exponential calculation. The second is to approximate the non-linear relationship between the output signal and the input signal through a method based on multiple iteration calculations. For example, the method based on exponential calculation can include rectifying and amplifying the input signal to generate an intermediate signal, obtaining a non-linear signal with a natural constant (e) as the base and the intermediate signal as an exponent, and generating the output signal according to a difference between a preset value and the non-linear signal.

For example, the method based on multiple iteration calculations can include obtaining the absolute value of the input signal and amplifying it to generate an intermediate signal, and using the intermediate signal to perform multiple iteration calculations to generate the output signal having the nonlinear relationship with the input signal. Each iterative calculation is $(2x-x^2)$, where x is the input signal for each iteration calculation.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A system for signal conversion in a neural network, the system comprising:
    a) a processing module comprising a rectifier circuit having a first diode, a proportional operation circuit, and a current mirror having first and second transistors, and being configured to control an output signal of the processing module to be a fixed value when an input signal of the processing module is in a first interval;
    b) the processing module being configured to control the output signal to be in a preset non-linear relationship with the input signal, when the input signal is in a second interval, wherein the processing module is configured to realize the preset non-linear relationship between the output signal and the input signal through exponential calculation;
    c) wherein the output signal increases nonlinearly with an increase of the input signal until converging;
    d) wherein the processing module comprises a first processing module having the proportional operation circuit and being configured to generate an intermediate signal after rectifying and amplifying the input signal, and a second processing module configured to perform a non-linear processing on the intermediate signal to generate the output signal, wherein the first processing module comprises an operational amplifier coupled to first and second resistors, and the second processing module comprises a second diode connected in series with the first transistor; and
    e) wherein the second processing module is configured to obtain a non-linear signal with a natural constant as a base and the intermediate signal as an exponent, and to generate the output signal according to a difference between the preset value and the non-linear signal.

2. The system of claim 1, wherein:
    a) when the input signal is less than zero, the input signal is in the first interval, and the output signal is zero; and
    b) when the input signal is not less than zero, the input signal is in the second interval.

3. The system of claim 1, wherein the operational amplifier is coupled to a common node of the first and second resistors.

4. The system of claim 1, wherein the first processing module comprises:
    a) the rectifier circuit, being configured to rectify the input signal to allow the input signal in the second interval to pass through; and
    b) a gain module configured to receive a first signal generated by the rectifier module, and generate the intermediate signal proportional to the first signal.

5. The system of claim 4, wherein an anode of the first diode is coupled to the gain module, and the cathode of the first diode is coupled to the input signal.

6. The system of claim 4, wherein the gain module comprises:
    a) the operational amplifier having a non-inverting input terminal for receiving a reference signal, and an inverting input terminal for receiving the first signal; and
    b) first and second resistors configured to set a gain of the operational amplifier, wherein the first resistor is connected between the first signal and the inverting input terminal of the operational amplifier, and wherein the second resistor is connected between the inverting input terminal and the output terminal of the operational amplifier.

7. The system of claim 1, wherein the second processing module further comprises a diode coupled to the current mirror.

8. The system of claim 1, wherein the second processing module comprises:
   a) wherein the second diode is connected in series with the first transistor to convert the intermediate signal into a current in an exponential form;
   b) a constant current source connected in series with the second transistor; and
   c) an output resistor connected between a common node of the constant current source and the second transistor and a ground, wherein the output signal is generated across the output resistor proportional to a difference between a current generated by the constant current source and the current in the exponential form.

9. The system of claim 1, wherein the processing module comprises:
   a) wherein the processing module is configured to realize the preset non-linear relationship between the output signal and the input signal through multiple iteration calculations;
   b) a third processing module configured to generate an intermediate signal after obtaining an absolute value of the input signal and amplifying the absolute value of the input signal, and a fourth processing module configured to perform a non-linear processing on the intermediate signal to generate the output signal having the preset non-linear relationship with the input signal; and
   c) wherein the fourth processing module comprises a plurality of calculation modules configured to be cascaded, and each of the plurality of calculation modules performs an iterative calculation of $(2x-x^2)$, wherein x is an input signal of each of the plurality of calculation modules.

10. The system of claim 9, wherein the third processing module comprises:
    a) an absolute value module configured to obtain an absolute value of the input signal; and
    b) a gain module configured to obtain the intermediate signal that is proportional to the absolute value of the input signal.

11. The system of claim 9, wherein the fourth processing module is configured to utilize the intermediate signal to perform multiple iteration calculations to generate the output signal having the preset non-linear relationship with the input signal.

12. The system of claim 9, wherein:
    a) the number of the plurality of calculation modules is N;
    b) each of the input terminals of second to Nth calculation modules is connected with an output terminal of a previous calculation module;
    c) an output terminal of the Nth calculation module generates the output signal; and
    d) N is a positive integer.

13. The system of claim 12, wherein the output signal generated by the fourth processing module approaches the preset non-linear relationship with the input signal when the iterative calculation is repeatedly performed.

14. A method for signal conversion in a neural network, the method comprising:
    a) controlling an output signal of a processing module to be a fixed value, when an input signal of the processing module is in a first interval, wherein the processing module comprises a rectifier circuit having a first diode, a proportional operation circuit, and a current mirror having first and second transistors;
    b) controlling the output signal to be in a preset non-linear relationship with the input signal, when the input signal is in a second interval, the processing module realizing the preset non-linear relationship between the output signal and the input signal through exponential calculation; and
    c) wherein the output signal increases nonlinearly with an increase of the input signal until converging;
    d) wherein the processing module comprises a first processing module having the proportional operation circuit for generating an intermediate signal after rectifying and amplifying the input signal, and a second processing module for performing a non-linear processing on the intermediate signal to generate the output signal, wherein the first processing module comprises an operational amplifier coupled to first and second resistors, and the second processing module comprises a second diode connected in series with the first transistor; and
    e) wherein the second processing module obtains a non-linear signal with a natural constant as a base and the intermediate signal as an exponent, and generates the output signal according to a difference between the preset value and the non-linear signal.

15. The method of claim 14, wherein an anode of the first diode is coupled to the gain module, and the cathode of the first diode is coupled to the input signal.

16. The method of claim 14, further comprising approximating the preset non-linear relationship between the output signal and the input signal through a method based on multiple iteration calculations.

17. The method of claim 14, wherein:
    a) when the input signal is less than zero, the input signal is in the first interval, and the output signal is zero; and
    b) when the input signal is not less than zero, the input signal is in the second interval.

* * * * *